No. 607,590. Patented July 19, 1898.
A. HEIL.
GALVANIC CELL.
(Application filed Dec. 1, 1897.)
(No Model.)
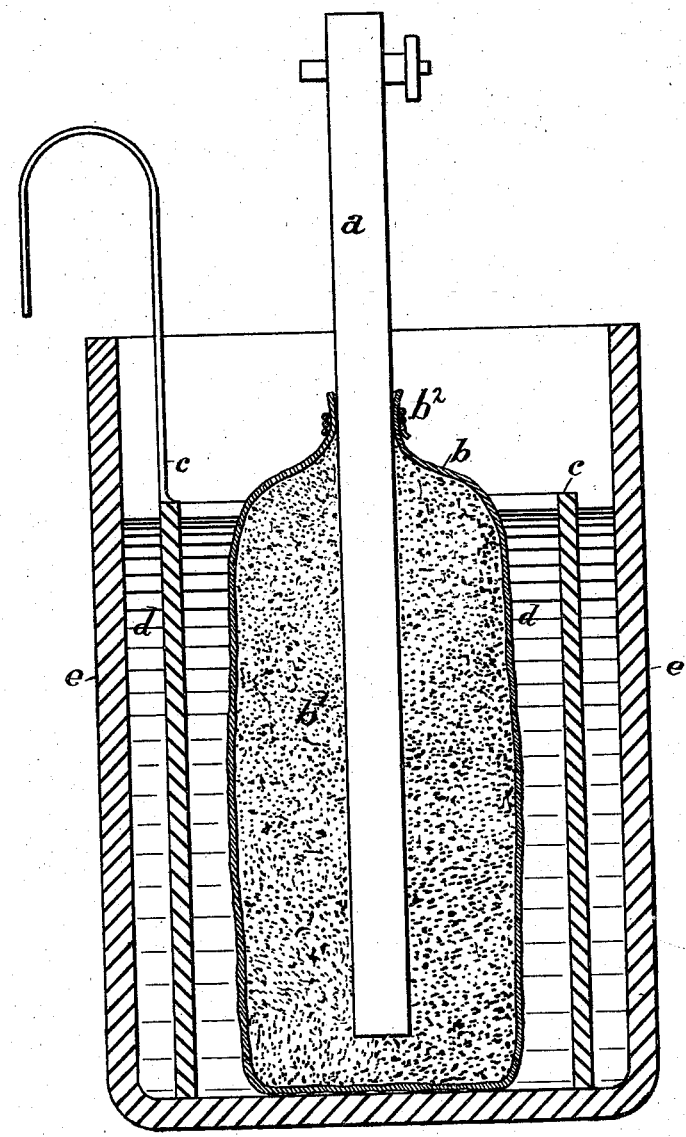
Witnesses:—
Edward Vieser
George Barry Jr.
Inventor
Albrecht Heil
by attorneys
Brown & Seward

UNITED STATES PATENT OFFICE.

ALBRECHT HEIL, OF FRÄNKISCH CRUMBACH, GERMANY.

GALVANIC CELL.

SPECIFICATION forming part of Letters Patent No. 607,590, dated July 19, 1898.

Application filed December 1, 1897. Serial No. 660,430. (No model.)

*To all whom it may concern:*

Be it known that I, ALBRECHT HEIL, of Fränkisch Crumbach, in the Grand Duchy of Hesse Darmstadt, in the German Empire, have invented a new and useful Improvement in Galvanic Cells, of which the following is a specification.

The present invention has for object to produce a primary galvanic cell which will generate a constant current of high intensity without employment of an acid. A cell embodying the said invention possesses the great advantage over other primary cells that it is not subject during rest to the injurious influence of local action and that the electrolyte is not materially altered during supply of current.

In the Leclanché cell, as is known, the ammonium of the ammonium chlorid is substituted by zinc during supply of current. Ammonia is formed, which escapes into the air, while in the case of the lead sulfuric-acid accumulator sulfate of lead is formed during rest by the action of the sulfuric acid upon the lead and its oxids. Injurious alteration thus takes place in the cells, which is not the case with the cell hereinafter described, with reference to the accompanying drawing, which represents a vertical section.

$a$ is a carbon electrode inserted into and surrounded by a small bag $b$, filled with a mixture $b'$ of about equal parts in volume of graphite, black oxid of manganese, ($MnO_2$,) and peroxid of lead, ($PbO_2$.) This bag is closed around the electrode and affixed thereto by a string $b^2$. In this mixture the graphite improves the conductivity.

The manganese peroxid is employed on account of its entirely neutral behavior and of its high capacity for absorption of the oxygen in the solution and the lead peroxid on account of the increased intensity it gives to the cell.

$c$ is the exciting or positive electrode of zinc.

$d$ is the electrolyte solution contained in the glass vessel $e$, in which the electrodes are placed. This electrolyte consists of an aqueous solution of zinc sulfate, to which sodium carbonate is added in such proportion that hydrate of zinc is precipitated in the form of small flocks. In preparing said electrolyte I generally add twenty (20) grams of sodium carbonate dissolved in one (1) liter of water to every four (4) liters of a saturated solution of zinc sulfate. In order that these flocks of hydrate of zinc, which might either sink to the bottom or float upon the solution, may remain permanently and regularly distributed, the solution is stirred with gypsum and sawdust to a pulp, and the electrode manufactured as before described is then immersed therein. Zinc is employed as the exciting or positive electrode.

The cell thus composed has an intensity of 1.8 volts.

I claim—

A galvanic cell comprising a carbon electrode surrounded by about equal parts by volume of graphite, manganese peroxid and lead peroxid, a zinc electrode and an absorbent filling holding an electrolyte of zinc sulfate containing flocks of hydrate of zinc evenly distributed throughout the mass of said electrolyte, substantially as described.

In testimony that I claim the foregoing as my invention I have signed my name in presence of two subscribing witnesses.

ALBRECHT HEIL.

Witnesses:
JEAN GRUND,
FRANK H. MASON.